(12) United States Patent
Van Riel et al.

(10) Patent No.: US 7,734,886 B1
(45) Date of Patent: Jun. 8, 2010

(54) CONTROLLING ACCESS TO CONTENT UNITS STORED ON AN OBJECT ADDRESSABLE STORAGE SYSTEM

(75) Inventors: Jan F. Van Riel, Geel (BE); Tom Teugels, Schoten (BE); Michael Kilian, Harvard, MA (US); Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 551 days.

(21) Appl. No.: 11/728,540

(22) Filed: Mar. 26, 2007

(51) Int. Cl.
*G06F 12/08* (2006.01)
(52) U.S. Cl. ........................ 711/163; 711/170
(58) Field of Classification Search ................. 711/163, 711/164, 170; 707/9
See application file for complete search history.

(56) References Cited

U.S. PATENT DOCUMENTS

2007/0073694 A1* 3/2007 Picault et al. .................. 707/9

OTHER PUBLICATIONS

U.S. Appl. No. 11/728,538, filed Mar. 26, 2007, Jan F. Van Riel, et al.
U.S. Appl. No. 11/728,539, filed Mar. 26, 2007, Jan F. Van Riel, et al.
U.S. Appl. No. 11/728,541, filed Mar. 26, 2007, Jan F. Van Riel, et al.

* cited by examiner

*Primary Examiner*—Pierre-Michel Bataille
(74) *Attorney, Agent, or Firm*—Krishnendu Gupta; Penelope S. Wilson (57) ABSTRACT

Aspects of the invention relate to sharing content stored on an object addressable storage (OAS) system among a plurality of users of the OAS system and authenticating users to an OAS system. In some embodiments, a user may store content units on the OAS system and control access by other users to these content units. In some embodiments, when a user grants one or more other users access to a content unit stored on the OAS system, the OAS system may send a notification of grant of access to the other user(s).

18 Claims, 4 Drawing Sheets

CONTROLLING ACCESS TO CONTENT UNITS STORED ON AN OBJECT ADDRESSABLE STORAGE SYSTEM

FIELD OF INVENTION

The present application relates to computer systems employing object addressable storage.

DESCRIPTION OF THE RELATED ART

Virtually all computer application programs rely on storage that may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping techniques may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

In contrast to block I/O storage systems, some storage systems receive and process access requests that identify a data unit or other content unit (also referenced to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments the storage system may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

SUMMARY

One embodiment is directed to a method of controlling access to a plurality of user content units stored on an object addressable storage system (OAS), wherein each of the plurality of user content units is accessible from the OAS system using an object identifier. The method comprises acts of: storing, in a security content unit on the OAS system, security information usable by the OAS system to control access to at least one other content unit of the plurality of user content units; and associating with the security content unit an object identifier so that the security content unit is accessible via the object identifier. Another embodiment is directed to at lest one computer readable medium that, when executed, performs the above described method.

A further embodiment is directed to an object addressable storage system (OAS) that stores a plurality of content units, wherein each of the plurality of user content units is accessible from the OAS system using an object identifier. The OAS system comprises: at least one memory; and at least one controller, coupled to the memory, that: stores in the at least one memory, in a security content unit, security information usable by the OAS system to control access to at least one other content unit of the plurality of user content units; and associates with the security content unit an object identifier so that the security content unit is accessible via the object identifier.

Another embodiment is directed to a method of controlling access to a plurality of user content units stored on at least one object addressable storage (OAS) system, wherein each of the plurality of user content units is accessible from the OAS system using an object identifier, the at least one OAS system being logically divided into a plurality of storage pools, a first user of the at least one storage system being granted access privileges to one of the plurality of storage pools. The method comprises acts, performed by the first user of the storage system, of: requesting the storage system to create a sub-pool of the pool to which the first user is granted access privileges; and identifying to the storage system at least one second user of the at least one storage system to whom the first user grants privileges to access content units stored in the sub-pool. A further embodiment is directed to at lest one computer readable medium that, when executed, performs the above described method.

Another embodiment is directed to a host computer for accessing a plurality of user content units stored on at least one object addressable storage (OAS) system, wherein each of the plurality of user content units is accessible from the OAS system using an object identifier, the at least one OAS system being logically divided into a plurality of storage pools, a first user of the at least one storage system being granted access privileges to one of the plurality of storage pools. The host computer comprises: an output; and at least one controller, coupled to the output, that: requests, via the output, the OAS system to create a sub-pool of the pool to which the first user is granted access privileges; and identifies to the OAS system at least one second user of the at least one storage system to whom the first user grants privileges to access content units stored in the sub-pool.

A further embodiment is directed to a method of controlling access to a plurality of content units stored on at least one object addressable storage (OAS) system, wherein each of the plurality of user content units is accessible from the OAS system using an object identifier, a first user of the at least one OAS system being granted access privileges to a first content unit stored on the at least one OAS system. The method comprises an act, performed by the first user, of: identifying to the OAS system at least one second user of the at least one OAS system to whom the first user grants privileges to access the first content unit. Another embodiment is directed to at lest one computer readable medium that, when executed, performs the above described method.

A further embodiment is directed to a host computer that accesses a plurality of content units stored on at least one object addressable storage (OAS) system, wherein each of the plurality of user content units is accessible from the OAS system using an object identifier, a first user of the at least one OAS system being granted access privileges to a first content unit stored on the at least one OAS system, wherein the host computer comprises: an output; and at least one controller, coupled to the output, that: identifies to the OAS system at least one second user of the at least one OAS system to whom the first user grants privileges to access the first content unit.

Another embodiment is directed to a method for use in a computer system having a plurality of users and comprising at least one object addressable storage (OAS) system that stores a plurality of user content units, wherein each of the plurality of user content units is accessible from the OAS system using an object identifier, the at least one OAS system storing a content unit that a first user has permission to access and the ability to grant access rights to other users. The method comprises acts of: receiving, from the first user, a request to grant access to the content unit to a second user of the plurality of users; granting access to the content unit to the second user; and sending, in response to the request, a notification to the second user that the second user has been granted access to the content unit. A further embodiment is directed to at lest one computer readable medium that, when executed, performs the above described method.

Another embodiment is directed to an object addressable storage (OAS) system that stores a plurality of user content units, wherein each of the plurality of user content units is accessible from the OAS system using an object identifier, the at least one OAS system storing a content unit that a first user has permission to access and the ability to grant access rights to other users, the OAS system comprising: an input; and at least one controller coupled to the input that: receives, from the first user via the input, a request to grant access to the content unit to a second user of the plurality of users; grants access to the content unit to the second user; and sends, in response to the request, a notification to the second user that the second user has been granted access to the content unit.

DETAILED DESCRIPTION

Embodiments of the present invention are directed to user authentication and sharing content among users in a computer system that employs OAS. Applicants have appreciated that OAS systems and the ways in which they can be used provide unique challenges and opportunities for sharing content among a number of users and authenticating those users. In one illustrative embodiment of the invention described below, the authentication and content sharing techniques of the present invention are described as being used in a unique information brokerage system built on OAS that is referred to as My World. However, it should be appreciated that the aspects of the present invention described herein are not limited in this respect, and that the authentication and information sharing techniques described herein can be employed with any computer system employing OAS.

In one embodiment, access to content units stored on an OAS system may be controlled by storing security information in a security content unit that is stored on the OAS system and is usable by the OAS system to control access to at least one other content unit stored on the OAS system. The security content unit may be associated with an object identifier and may be accessed using the object identifier. Because OAS systems are capable of storing a large number of content units, storing security information in a content unit may be beneficial in systems which have a large number of users.

In another embodiment, content units stored on an OAS system may be logically divided into a plurality of storage pools, at least one of which belongs to a user. The user may send a request to the OAS system to create a sub-pool that comprises a subset of the content stored in the user's pool and may identify to the OAS system at least one other user to whom the user grants access to the content stored in the sub-pool. Thus, a user has the ability to control which other users have access to the content units in his or her pool and can control access to each content unit individually.

In another embodiment, a user may specify for a content unit that the user has stored on an OAS system at least one other user to whom the user grants access to the content unit. Thus, the user may define, for each content unit, one or more other users that are permitted to access that content unit.

In another embodiment, when a user grants access to a content unit stored on an OAS system to another user, the OAS system may send a notification to the user who has been granted access indicating that the user has been granted access to the content unit.

As discussed above, in one embodiment, the aspects of the present invention relating to authenticating users in a computer system employing an OAS system are described as being employed in a computer system implementing the My World information brokerage concept described below. However, it should be appreciated that the aspects of the present invention described herein are not limited in this respect, and can be employed to authenticate users and share content in any computer system that employs content that is stored on an OAS system and accessed by one or more users or user devices.

I. The My World Information Brokerage System

My World is a concept relating to an information brokerage system built on a foundation of OAS systems to store information. The My World concept recognizes that our lives are continually involving more and more digital content that pervades numerous aspects of our lives. Examples include entertainment (e.g., music, video, etc.), communications (e.g., e-mail), health care (e.g., storing an individual's health records digitally), finance (e.g., online banking, investments, etc.) and photography. Increasingly, an individual is relying less upon a specific physical device to store his/her digital content (e.g., a home or business computer), and is relying upon online sources to store such content. Examples of such online services include online e-mail providers, online services for organizing and distributing photographs, online services for storing and distributing music and videos, online banking and online services for storing and organizing medical records. Much of this content is fixed, such that after the content is created it is not modified.

The My World information brokerage concept envisions a process of interaction between people and their information. In the examples described herein, much of this information relates to fixed content information. However, it should be appreciated that the My World information brokerage concept and the aspects of the present invention described herein are not limited in this respect, and can also be employed with content that is modifiable. In accordance with the My World information brokerage concept, all (or a majority) of an individual's content is stored (in a safe and secure manner) online, and is accessible to the user anywhere from any device, including mobile and wireless devices. The content is held indefinitely and can be shared with others. Users create, view, store and exchange content in a manner that is completely independent of any details about where or how the information is actually stored. From the user's perspective, the online experience is one wherein the network of intermediaries and information brokers are trusted, and the user may access this network using any desired device (e.g., a laptop, a cellular phone, a digital camera, an MP3 player, a digital video recorder, etc.). The user's experience is one that is organized in ways that make content searchable and easy to find, without the need to remember where it is physically stored. For example, according to the My World information brokerage concept, an individual may have entities such as My Family, My Doctor, My Lawyer, and My Bank, and work with objects within those entities such as My Music, My Pictures, My Medical Records, My Contracts, and My Financial Records.

The backbone of the My World information brokerage concept is the use of OAS systems to store the content for the users. OAS systems provide a number of advantages over other types of storage systems (e.g., block I/O storage systems) for this application. For example, an OAS system employs a user interface that enables content to be accessed via an object identifier that is independent of where the content is logically or physically stored. This characteristic of OAS systems is advantageous for the My World information brokerage concept, and any other system wherein it is desired to enable the user to access content units based solely upon the nature of the content (or metadata associated with it) and not based upon information specifying where the information is stored so that the storage location is transparent to the user.

In addition, the My World information brokerage concept envisions that more and more metadata increasingly may be associated with units of content (e.g., the date on which a photograph was taken, location information about where the photograph was taken, etc.), and that users should be able to locate content by searching for the associated metadata. As discussed in more detail below, OAS systems provide a convenient mechanism for associating metadata with content, and do so far more simply and efficiently than other types of storage architectures (e.g., block I/O storage systems or file system storage architectures).

Some examples will now be provided of the ways in which the My World information brokerage concept can be employed to manage various types of content online.

1. Financial Information

One example of information that can be brokered using the My World information brokerage concept is financial information. Increasingly, banking, insurance, and other financial institutions may desire to provide online services to individuals to manage their financial information while enabling the information to be captured, annotated and retained for extended periods of time. Much of the information may originate at the financial institution and can be viewed as a time series of events captured as fixed content records or documents (e.g., account transactions, mortgage contracts, insurance policies, etc.). The individual may wish to have access to this information for viewing or sharing and would like to think of that information as content belonging to the individual. The individual may wish the information to be stored in a way so that it is safe (e.g., can't be lost), secure (e.g., only the user or those to whom he/she grants access can view it) and accessible in the sense that the user can get access to it whenever and wherever the user desires. In addition, the user does not want to be concerned about where the information is physically stored, but would like it to be retrievable by attributes that the user can remember and/or search for. In accordance with the My World information brokerage concept, all of an individual's financial information can be stored in a core of one or more OAS systems as a set of content units that each is identified by an object identifier, and can be accessed by the user from the core via any device, including any of the illustrative devices discussed above (e.g., cellular phones, laptops, other wireless devices).

2. Medical Information

Another example relates to medical information. Over the course of a lifetime, people build up a medical history that includes a collection of medical records (e.g., MRI pictures, x-rays, insurance documents) that may reside at various hospitals, doctors' offices and insurance companies, as well as perhaps at the individual's home, so that it may be a daunting task to assemble all of this information at any particular point in time.

In accordance with the My World information brokerage concept, the individual may be viewed as keeping this history in a logical sense, even though the actual content files may be stored on remote and distributed storage systems. For example, MRI images may be stored in archives at hospitals along with metadata associated with that content (e.g., in the form of annotations to the MRI images) that facilitate their use. According to the My World information brokerage concept, the actual OAS systems that store the medical information (e.g., at a hospital, an insurance company, a doctor's office, etc.) form part of the core of object addressable storage that is accessible to an individual, so that an individual can find all of his/her medical records simply by asking the core to provide the individual's medical records, or by searching for them using easily remembered search terms that can correlate to metadata associated with the content (e.g., find for me all of my MRI images).

3. Digital Pictures

Another example for use of the My World information brokerage concept relates to digital pictures. Today, digital cameras and camera phones with wireless capability are becoming more prevalent, and they often are used to render and play content. However, the complexity of storing and finding images hinders individuals. According to the My World information brokerage concept, individuals should be able to take pictures anywhere they are and look at them or share them with others wherever and whenever they want. In addition, they should be able to do this quickly and easily, without, for example, loading pictures onto a PC from the camera via a cable or memory card, determining a storage location on a home computer for the photos or uploading them to online photo albums.

In addition, according to the My World information brokerage concept, rather than finding pictures by remembering where they were stored, an individual can locate them simply by searching based upon attributes related to the pictures. In this respect, the content of the photos can be stored along with metadata relating to them. This metadata can take any of numerous forms, examples of which include the geographic location where the pictures were taken, an event at which they were taken and/or a time at which they were taken. The metadata can be generated manually or automatically. In this respect, ever advancing technology may enable more and more information to be automatically captured and stored as metadata associated with content. For example, future cameras may be equipped with electronic sensors that capture user identification information via biometric analysis (e.g., fingerprints or an iris), may capture date, time and location information via global positioning signals, and/or may add temperature or humidity information by direct sensing. Additional metadata for a photograph can include information that identifies the individuals in a photograph, with the identifying information being provided manually or automatically (e.g., by facial recognition software).

In accordance with the My World information brokerage concept, both the content (i.e., the images) and the metadata associated with it can be uploaded to the core automatically, without human intervention, and the user need not care (or even be aware) about where the objects are stored, but should be comforted that they are safe and secure and can be retrieved easily by simply asking the core for the individual's photos and/or searching the metadata associated with the images.

4. Music and Video

In another example, an individual may wish to find and play music and/or video to which the user has obtained digital rights, and may wish to do so independent of whatever device(s) are available to the user at any particular time to listen to the music or view the video. The individual may be home, in an airplane, hotel room, etc., and depending upon his/her location and the availability of various devices at that location, the individual may wish to choose a particular device on which to listen to music or view video. In accordance with the My World information brokerage concept, the individual may be able to drop a piece of content on any available device. This device can be a specialized device for listening to music or viewing video, or may be any other suitable device such as a laptop or a cellular phone.

5. E-mail

E-mail typically spans an individual's work and private life, and a user may maintain multiple e-mail accounts for different purposes (e.g., a work account provided by an employer and a personal account on an online e-mail service). Nevertheless, in accordance with the My World information brokerage concept, the user may view all of it as his/her e-mail, and may have all his/her e-mail stored in the core in a safe and secure manner indefinitely. The e-mail can be searched much like searching for any content on the Internet today, and can be viewable and sharable using any suitable device.

6. Other Examples

The foregoing examples are provided solely for illustrative purposes, and it should be appreciated that numerous other types of content can be stored and organized in accordance with the My World information brokerage concept, including not only content types and associated metadata that can be generated by existing technologies, but also those that will be generated by yet to be developed technologies.

7. Summary of the My World Information Brokerage Concept

As should be appreciated from the foregoing, the My World information brokerage concept envisions services that manage content through the use of a virtual place that accumulates and stores content that is created by different applications and devices but owned by and related to an individual, and wherein a user's content is readily and securely retrievable by that individual from anywhere using any device. The user is provided with the comfort that his/her content will be retained indefinitely and cannot be lost, the simplicity of not having to manage where the content is stored, and the ability to retrieve it any time anywhere, and from any device.

It should be appreciated that some of the above-described features of the My World information brokerage concept are presently being performed today by various online services (e.g., e-mail services, photograph services, music and video services, medical records services, etc.). However, the My World information brokerage concept envisions a more expansive system. In addition, while it is not necessary to implement the My World information brokerage concept, in one embodiment the user may access his/her content through a common user interface and may be able to gain access to content without needing to authenticate and authorize the user to disparate services, thereby unifying the experience for the user.

II. The Use of OAS for Implementing the My World Concept

As mentioned above, OAS provides advantages for implementing a system such as that described above in connection with the My World information brokerage concept. Two characteristics that make OAS particularly well suited for this type of system include location independent storage and ease of associating metadata with content.

1. Location Independence

As discussed above, many storage architectures identify content using an identifier that may be tied to a physical and/or logical location at which the content is stored (e.g., a logical volume in a block I/O storage system and a directory or file in a file system). Conversely, in an OAS system, content may be identified using an object identifier that may be entirely independent of any logical and physical locations wherein the content is stored. As one of the goals of the My World information brokerage concept is to free the user from needing to remember where content is physically or logically stored, and to enable the core storage component(s) of the system to move content around if desired, the location independence of an OAS system is well suited for use in this environment.

2. Associating Metadata with Content

As should be appreciated from the foregoing discussion, one component of the My World information brokerage concept is to leverage metadata associated with content. Other types of storage architectures provide no convenient mechanism to associate metadata with content. For example, in a file system structure, if it was desired to associate metadata with a piece of content (e.g., a picture), a user typically needs to create a metadata file to hold the metadata associated with the content, create a directory that includes the metadata file and the content (e.g., the photo), and that arrangement within a common directory must be maintained. That is inefficient.

Many OAS systems are more conducive to easily and efficiently associating metadata with content. This can be done in various ways, and it should be appreciated that the aspects of the present invention described herein are not limited to use with an OAS system that associates metadata with content in any particular manner. One example of an OAS system that associates metadata with content is one that uses a content descriptor file (CDF)/blob architecture as described in a number of the applications listed below in Table 1. In accordance with the CDF/blob architecture, content can be stored in a blob and have an object identifier (e.g., a content address) associated with it, and a CDF created for the blob can include the object identifier for the blob as well as metadata associated with it. The CDF is independently accessible via its own object identifier. By accessing the CDF, the content in the blob can be efficiently and easily accessed (via its object identifier that is included in the CDF) along with its associated metadata.

Another example of a technique for associating metadata with content in an object addressable system is the eXtensible Access Method (XAM) proposal that is being developed jointly by members of the storage industry and is proposed as a standard. In accordance with XAM, an "XSET" can be defined to include one or more pieces of content and metadata associated with the content, and the XSET can be accessed using a single object identifier (referred to as an XUID). Taking the above example of the piece of content relating to a photograph, an XSET can be created and the photograph itself can be provided as a first "stream" to the XSET. One or more files (e.g., text files) can be created to include metadata relating to the photograph, and the metadata file(s) can be provided to the XSET as one or more additional streams. Once the XSET has been created, an XUID is created for it so that the content (e.g., the photograph) and its associated metadata can thereafter be accessed using the single object identifier (e.g., its XUID).

Again, it should be appreciated that the CDF/blob and XSET techniques for associating metadata with content are merely two examples of ways in which content can be associated with metadata in an OAS system, and that the aspects of the present invention described herein are not limited to use in a system that employs one of these or any other particular technique for associating metadata with content.

III. Authenticating Users

In conventional OAS systems, authentication is application-based. That is, each application program that accesses content on an OAS system has a profile which defines authentication information (e.g., a login name and password) for the application program. The OAS system stores the profile as a file in an internal file system. The application program may log in to the OAS system by providing the OAS system with its authentication information. The OAS system may verify the authentication information (e.g., log in name and password) provided by the application program by comparing it with the information stored in the profile for the application program.

Applicants have appreciated that this approach presents a number of disadvantages. First, because this system of authentication is application-based, it does not permit individual users to log in to the OAS system with varying levels of access. That is, all users using an application program have access to the same content.

Second, because the profile for each application program is stored as a file in an internal file system, the authentication system does not scale to a large number of users or application programs. That is, file systems place a limit the number of files that can be stored in the file system. Thus, the number of profiles that can be stored in the file system may be limited based on the number of files which the file system permits. Moreover, as the number of files increases, the time taken to locate the file corresponding to a particular application program or user may increase, which may limit access times if an OAS system is configured with a large number of profiles. Further, when the file system is large (i.e., stores a large number of files), the map that maps file names to disk locations may be too large to be stored entirely in memory. Thus, a portion of the map may be stored on disk. Thus, in some situations, it may be necessary to load a portion of this map from disk into memory in order to access a profile for a user or application program. This may increase the time taken to authenticate an application program or user.

In some embodiments, My World may have millions of users. Applicants have appreciated that it may be desirable to have separate profiles for each and that having a separate file in a file system for each user may not be practical (e.g., for the reasons discussed above). Aspects of the invention relate to an alternative to storing a profile as a file in a file system. However, it should be appreciated that these aspects are not limited to use with My World systems or systems with millions of users, as these aspects may be used in a system with any suitable number of profiles.

As discussed above, OAS systems are capable of storing a large number of content units (e.g, CDFs, blobs, XSETs, and/or other content units) and providing access to each of these objects via an object identifier. Applicants have appreciated that these content units may be used to store authentication information. Thus, in some embodiments, security information used by an OAS system to authenticate users may be stored in security content units on the OAS system. This may be done in any suitable way, as the invention is not limited in this respect. For example, in some embodiments, a security content unit may be created for each user of the OAS system that stores content usable by the OAS system to authenticate a user seeking to log in to the OAS system. Any suitable content usable by the OAS system to authenticate a user to the OAS system may be stored in the security content unit, as the invention is not limited in this respect. For example, in some embodiments, a log in name (e.g., a user name) and password may be stored in the security content unit. However, the invention is not limited in this respect, as other types of authentication information can also be used.

It should be understood that, in some embodiments, information (including other types of security information) in addition to the security information used to authenticate a user may be stored in a security content unit. Any type of additional information may be stored in the security content unit, as the invention is not limited in this respect. For example, as described below in greater detail, a security content unit for a user may also include information that describes access privileges for one or more other content units stored on the OAS system.

Applicants have appreciated that storing information usable by an OAS system to authenticate users in a security content unit stored on the OAS system provides benefits in numerous types of systems. For example, in a computer system employing the My World concept, a large number of OAS systems may be employed that each have a large number of users. Storing authentication information for users in a security content unit allows My World to support a large number of users because the OAS systems can easily support storage of a large number of security content units. Further, the security content unit for a user may be accessed regardless of on which OAS system in My World the security content unit is stored and regardless of to which OAS system the user connects.

A security content unit for a user may be created in any suitable way, as the invention is not limited in this respect. In some embodiments, an administrator of the overall system may create a security content unit for a user on an OAS system, thereby enabling the user to log in to the OAS system. The administrator may be, for example, a human administrator, or may be a software program. In embodiments in which the administrator is a software program, a user may identify himself or herself to the administrator as a new user. In response, the administrator may prompt the user to provide security information that the OAS system may use to authenticate the user (e.g., a log in name and/or password) in the future. The user may provide the security information to the administrator and the administrator may create a security content unit that stores the security information. As above, the security content unit may include just the authentication information or the authentication information and other information. The security content unit may be identified on the OAS system via an object identifier generated in any suitable way (e.g., a content address generated, at least in part, from at least a portion of the content unit or any other suitable object identifier).

An OAS system may authenticate a user using the information in the security content unit for that user in any suitable way, as the invention is not limited in this respect. For example, in some embodiments, an OAS system may store mapping information that maps an identifier for the user (e.g., the user's log in name or other suitable identifier) to the object identifier for the user's security content unit. Thus, the OAS system may authenticate a user by receiving the user's identifier and/or other authentication information, using the mapping information to determine the object identifier for the user's security content unit, accessing the security content unit using the object identifier, retrieving the authentication information from the security content unit, and comparing this authentication information to the authentication information retrieved from the user to authenticate the user's identity.

In some embodiments, a user is not required to authenticate himself or herself for every access request to the OAS system, and may be required to provide authentication information just once for every log in session. The OAS system may implement such a session and determine that subsequent communications are received from the authenticated user in any suitable way, as the invention is not limited in this respect. For example, in some embodiments, when a user authenticates to an OAS system, the OAS system may maintain an open socket (e.g., a TCP/IP socket) for the duration of the log-in session between the OAS system and the user. The OAS system may assume that any subsequent communications received via that socket are from the authenticated user. The OAS system may close the socket in any suitable way. For example, the OAS system may close the socket when the user sends a log out communication to the OAS system. Alternatively or in addition, the OAS system may close the socket when the time since receipt of the last communication from the user exceeds a certain threshold.

In some embodiments, when a user authenticates to an OAS system, the OAS system may provide the user with a token. The user may provide the token to the OAS system with subsequent communications. Thus, the OAS system may assume that any communication that includes the token is from the authenticated user. Any suitable token may be used, as the invention is not limited in this respect. In some embodiments, the object identifier for the user's security content unit may be used as the token. Thus, for example, when the user attempts to log into the OAS system, the OAS system may determine the object identifier for the user's security content unit (e.g., in the manner described above or in any other suitable way). If the user successfully authenticates (e.g., by providing the correct authentication information), the OAS system may provide the object identifier for the user's security content unit to the user. The user may then use this object identifier as the token in subsequent communications to identify himself or herself to the OAS system.

The OAS system may expire the token at the end of the session, such that once the session is ended the user may need to re-authenticate to obtain another token. The OAS system may end the session in any suitable way, as the invention is not limited in this respect. For example, the OAS system may end the session when the time since receipt of the last communication from the user exceeds a certain threshold and/or when the user sends a log out communication to the OAS system.

Applicants have appreciated that in some situations it may be desirable to use a separate server or computer to assist in authentication, rather than having the OAS system perform authentication. For example, Applicants have understood that many computer systems may already have a system that performs authentication for other reasons, or that a commercially available authentication system can be added to the computer system so that the capabilities provided thereby need not be built into the OAS system. Thus, in some embodiments, a separate security server may be operate in conjunction with the OAS system to authenticate users. This may be done in any suitable way, as the invention is not limited in this respect. In addition, any suitable security server may be used, as the invention is not limited in this respect. In some embodiments, a server implementing Active Directory™ available from Microsoft Corp. of Redmond, Wash. may be used as the security server to assist an OAS system in authenticating users. The security server may be implemented in any suitable way, as the invention is not limited in this respect. For example, the security server may be implemented as one or more separate computers, or may be implemented on one or more computers that also form a part of the OAS system.

Figure 1:
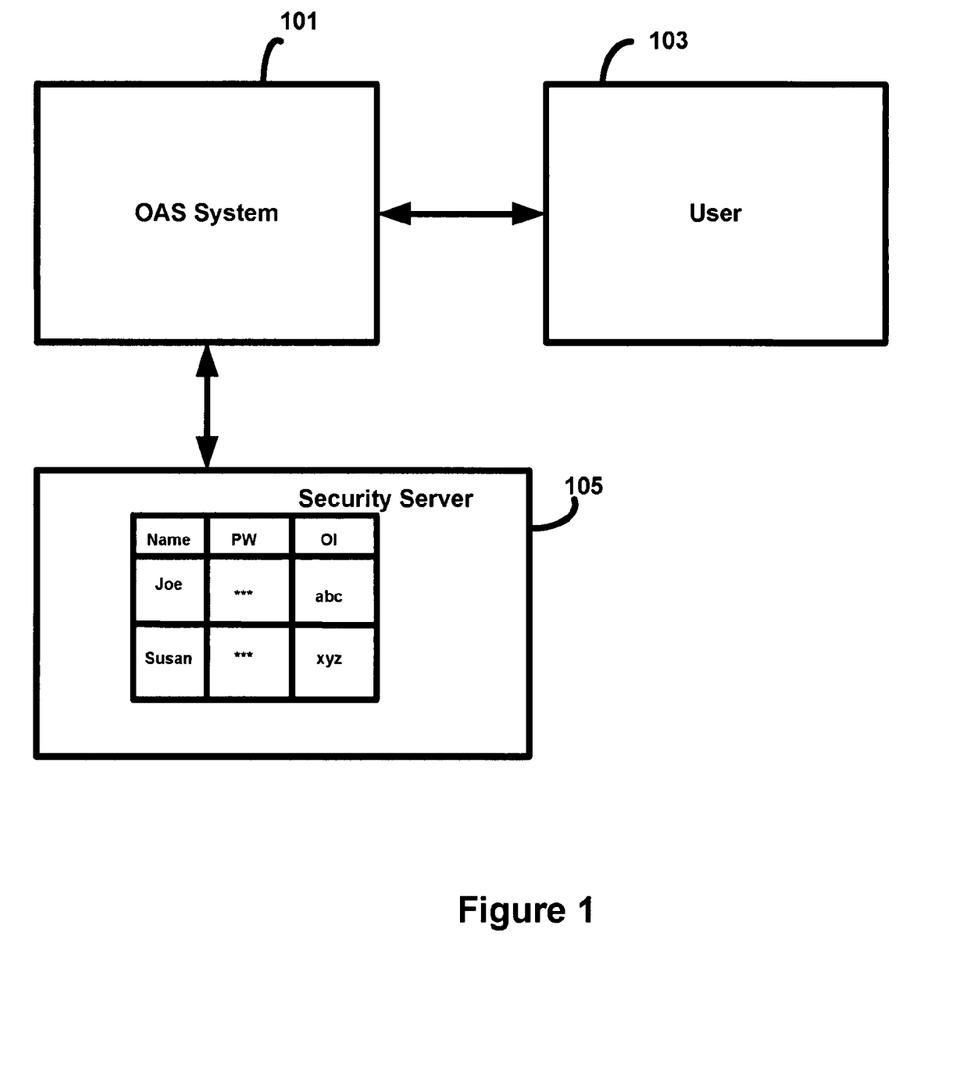
FIG. 1 is a block diagram of a computer system in which a user is authenticated to an OAS system using a security server, in accordance with one embodiment of the invention.

For example, as shown in FIG. 1, a user 103 authenticates to an OAS system 101. The OAS system may use a security server 105 to assist in the authentication of the user. In some embodiments, the security server may store, for each user of the OAS system, information that includes an identifier for the user (e.g., a log in name), the object identifier for the security content unit for the user, and/or authentication information (e.g., a password). The information for the user on the security server may be created in any suitable way, as the invention is not limited in this respect. For example, in some embodiments, when an administrator creates a security content unit for a user, the administrator may also create an entry for the user on the security server that includes, for example, the authentication information and the object identifier for the user's security content unit.

In embodiments in which a security server is used to authenticate a user to an OAS system, some, all, or none of the authentication information used to authenticate the user to the OAS system may be stored in the user's security content unit, as the invention is not limited in this respect. For example, the security server may store the authentication information and the security content unit may store other information, such as, for example, information relating to the user's access privileges and/or information relating to access privileges for other users to content stored on the OAS system by the user. In some embodiments, the security content unit may store only a portion of the authentication information and the security server may store all of the authentication information or a subset thereof that, when combined with the subset stored by the security content unit may make up the total authentication information. For example, the security content unit may store a user's log in name, and the security server may store the user's log-in name and password, or the security server may store just the user's password and the OAS system may provide the security server with the user's log in name when a user attempts to log in.

In addition, in some embodiments in which a security server is used to authenticate a user to an OAS system, the OAS system need not store information mapping a user identifier, such as a log in name, to the object identifier for the security content unit. Rather, the mapping information may be stored by the security server and the OAS system may rely on the security server to determine the object identifier of security content unit for a user, based on an identifier for the user.

The OAS system and the security server may authenticate a user in any suitable way, as the invention is not limited in this respect. For example, in some embodiments, a user may initiate the authentication process by providing authentication information, such as a log in name and/or password to an OAS system. In response, the OAS system may provide the log in name and/or password to the security server. The security server may use the log-in name to locate an entry for the user in a data set of authentication information and determine if the password provided by the OAS system matches the stored password for the user. If the password matches, the security server may provide the object identifier for the user's security content unit to the OAS system and may indicate that the user has been successfully authenticated. In some embodiments, the OAS system may then send a communication to the user to indicate that the user has been successfully authenticated. In some embodiments, if the password does not match, the security server may inform the OAS system that authentication failed and the OAS system may take any suitable action in response, such as, for example, denying the user access to the OAS system and/or prompting the user to re-send his or her authentication information.

As discussed above, once the user has been authenticated, the OAS system may allow subsequent communications from the user to proceed without requiring re-authentication in any suitable way. For example, as discussed above, the OAS system may maintain a log-in session with the user via an open socket or via use of a token.

IV. Controlling Access to Content

Applicants have appreciated that in addition to authenticating users (e.g., verifying that a user is who he/she says he/she is), it may be desirable to control access to one or more content units stored on OAS system. For example, both a first user (e.g., with the log in name "Joe") and a second user (e.g., with the log in name "Mary") may store content on the same OAS system or group of OAS systems that together provide a pool of storage. It may be desired to permit Joe to access the content that he has stored on the OAS system, but deny Mary access to this content. Similarly, it may be desired to permit Mary to access the content that she has stored on the OAS system, but deny Joe access to this content. In addition, in some situations, Joe may wish to allow Mary to access all or a portion of the content that he has uploaded, and Mary may wish to allow Joe to access all or a portion of the content that she has uploaded.

Applicants have recognized that providing a user with ability to control access to the user's content by granting selected other users access to all or selected portions of the content may be particularly useful in systems where the are a large number of users, each of which may have content stored on an OAS system and may wish to share selected portions of their content with other users. My World is an example of such a system.

In conventional OAS systems, access control is performed on an application program basis using virtual pools. A virtual pool is a collection of one or more content units and the use of virtual pools in OAS systems is described in greater detail in co-pending U.S. application Ser. Nos. 10/910,985; 10/911,330; 10/911,248; 10/911,247; and 10/911,360, listed below in Table 1. Thus, in these systems, each content unit is stored in a virtual pool. The OAS system tracks the virtual pool to which each content unit belongs (e.g., using a database) and tracks which application programs are permitted to access the content units in that virtual pool. Thus, if an application program attempts to read a content unit stored in a virtual pool to which it does not have access, the OAS system will not permit the application program to access the content unit.

While this system of access control prevents application programs from accessing content units to which they are not permitted to have access, it does so on a pool-by-pool basis. That is, either an application program has access to all the content unit stored in a virtual pool or none of the content units stored in a virtual pool. There is no way to specify, for each individual content unit, which application programs are permitted to access that content unit. In addition, in such systems, application programs do not have the ability to specify which other application programs are permitted to access a particular virtual pool and do not have the ability to create virtual pools. Thus, for example, if one application program stores content units in a virtual pool called "Engineering Department" it cannot grant access privileges to that virtual pool to another application program. Rather, only a human system administrator with system administrator privileges (not a user or application program with user or application program privileges) can define access privileges to a virtual pool and create virtual pools.

In some embodiments of the invention, a user is provided with the ability to grant access privileges to other users to any of the content units that the user has stored on the OAS system. This may be done in any suitable way, as the invention is not limited in this respect.

In some embodiments, the ability of a user to grant access privileges to other users to the content units that the user has stored on the OAS system may be accomplished using virtual pools. For example, a "home" virtual pool may be created for each user. A user is granted the ability to create additional sub-pools that may include all or any subset of the content units in the user's home pool. The user may identify for each virtual pool or sub-pool the users that are permitted to access the content units stored in that virtual pool and the access privileges that each users has (e.g., read, write, delete, query). In some embodiments, a home pool can only be defined by a system administrator with administrator privileges so a user cannot improperly add content units of another user to his or her home pool. The user can then create sub-pools of the home pool and add any content unit stored in the home pool to any one or more of the sub-pools.

As described in co-pending U.S. application Ser. Nos. 10/910,985; 10/911,330; 10/911,248; 10/911,247; and 10/911,360, virtual pools may be implemented in any suitable way, as the invention is not limited in this respect. For example, in some embodiments, an OAS system may maintain a database that identifies, for each content unit, to which virtual pool or virtual pools the content unit belongs. In some embodiments, a content unit may belong to multiple virtual pools. That is, for example, a content unit stored on the OAS system by a user may be stored in the user's home pool and one or more of the sub-pools created by the user.

In some embodiments, information identifying the virtual pool to which a content unit belongs may be stored in the content unit itself. Because a user has the ability to create a virtual pool and identify users that are permitted to access the content units stored in that virtual pool, the user may define, for each content unit the user has stored on the OAS system, which users are permitted to access the content unit and what access privileges each user has. For example, a user could create a separate pool for each content unit that user has stored on the OAS system, and define for each of these pools the user or users that are permitted to access the content unit stored in that pool. In some embodiments, the user may also specify actions each user is authorized to take, although not all embodiments are limited in this respect and consistent access privileges (e.g., read only) maybe granted for all users of a virtual pool.

The OAS system may track which pool is a user's home pool and which sub-pools the user has created in any suitable way, as the invention is not limited in this respect. In some embodiments, a user's security content unit can identify the user's home pool and sub-pools. Thus, for example, when a security content unit for a user is created, the security content unit may include the name and/or other identifier for the user's home pool. Each time the user creates a new sub-pool, the name and/or other identifier for the sub-pool may be added to the user's security content unit. It should be understood that the invention is not limited to tracking the virtual pools created by a user by storing information in the user's security content unit, as the virtual pools created by each user may be tracked in any suitable way.

When a user desires to write a content unit to the OAS system, the OAS may determine in which virtual pool or pools to store the content unit in any suitable way, as the invention is not limited in this respect. For example, in some embodiments, when a user authenticates to the OAS system, the OAS system may determine the object identifier for the user's security content unit (e.g., in the manner discussed above). The OAS system may then access the security content unit and determine which virtual pool is the user's home pool. When the user subsequently issues a write request to the OAS system to store a content unit and does not specify a virtual pool in which to store the content unit, the OAS system may store the content unit in the user's home pool.

In some embodiments, when a user stores a content unit on the OAS system, the user may specify one or more virtual pools in which to store the content unit. The user may specify this information in any suitable way, as the invention is not limited in this respect. In some embodiments, when a user issues a request to store a content unit on an OAS system and specifies a virtual pool in which to store the content unit, the OAS system may determine whether the user has "write" access to the specified virtual pool before storing the content unit in the specified virtual pool. Similarly, when a user issues a request to read a content unit in a virtual pool, the OAS system may determine whether the user has "read" access to the virtual pool in which the content unit is stored.

When a user issues a read request for a content unit, the OAS system may determine whether the user has "read" access to the content unit. This may done in any suitable way, as the invention is not limited in this respect. For example, in some embodiments, the OAS system may first determine the user that stored the content unit on the OAS system. This may be done in any suitable way, as the invention is not limited in this respect. For example, the OAS may maintain a database that identifies for each content unit the user and/or the object address of the security content unit of the user that stored the content unit on the OAS system. In some embodiments, information identifying the user that stored the content unit on the OAS system may be stored in the content unit itself.

Once the OAS system determines the user that stored the content unit on the OAS system, the OAS system may determine the virtual pools in which the content unit is stored. Then, the OAS system may access that security content unit of the user that stored the content unit on the OAS system and determine, based on information stored in the security content unit, if the user attempting to read the content unit has "read" access to any of the virtual pools in which the content unit is stored.

The OAS system may track the access permissions for a virtual pool in any suitable way, as the invention is not limited in this respect. For example, as discussed above, in some embodiments, information identifying which users are permitted to access a particular virtual pool and what level of access privileges each user has to that virtual pool may be stored in the security content of the owner of that virtual pool. For example, a first user (e.g., a user with the log in name "Joe") may have a "home" pool and three sub-pools. Joe's security content unit may identify the name and/or other identifier for his home and each of his three sub-pools In addition, Joe's security content unit may store information, for each virtual pool, that specifies which other users have access to the virtual pool and what level of access each of these users has. This may be done in any suitable way, as the invention is not limited in this respect. In some embodiments, the security content unit may include an identity list for each virtual pool identified in the security content unit. The identity list for a particular virtual pool identifies the other users that are permitted to access the content stored in that virtual pool and the level of access that each of these users has.

A user may create a sub-pool of content units in any suitable way, as the invention is not limited in this respect. In some embodiments, an authenticated user may send a request to an OAS system to create a new sub-pool. When the OAS system receives the request, it may facilitate creating and populating the virtual pool in any suitable manner, as the invention is not limited in this respect. For example, the OAS system may access the security content unit for the user and place the name and/or other identifier for the virtual pool in the user's security content unit.

Figure 3:
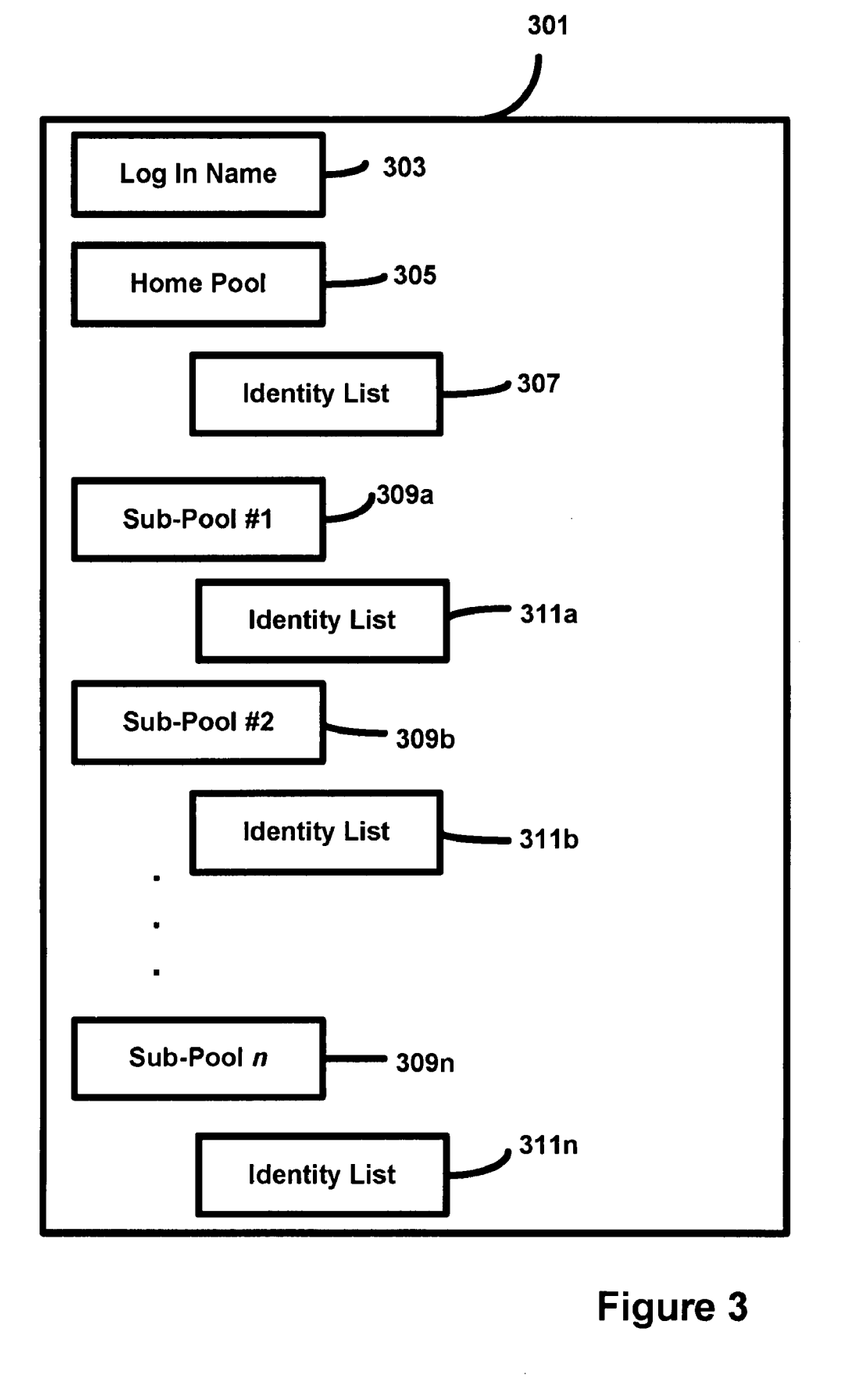
FIG. 3 is a diagram of a security content unit, in accordance with one embodiment.

FIG. 3 shows an example of a user's security content unit 301 in accordance with some embodiments of the invention. The content unit includes a log in name of the user (303) and information identifying the user's home pool (305). The content unit also includes an identity list (307) associated with the user's home pool that identifies the other users that have access to the user's home pool and (optionally) the level of access that these users have. The content unit may also include information identifying each sub-pool created by the user (309a, 309b, . . . , 309n) and may include an identity list associated with each sub-pool (311a, 311b, . . . , 311n), each of which includes information identifying the other users that have access to its associated sub-pool and the level of access of these users.

A user may specify access permissions for a virtual pool in any suitable way, as the invention is not limited in this respect.

Figure 2:
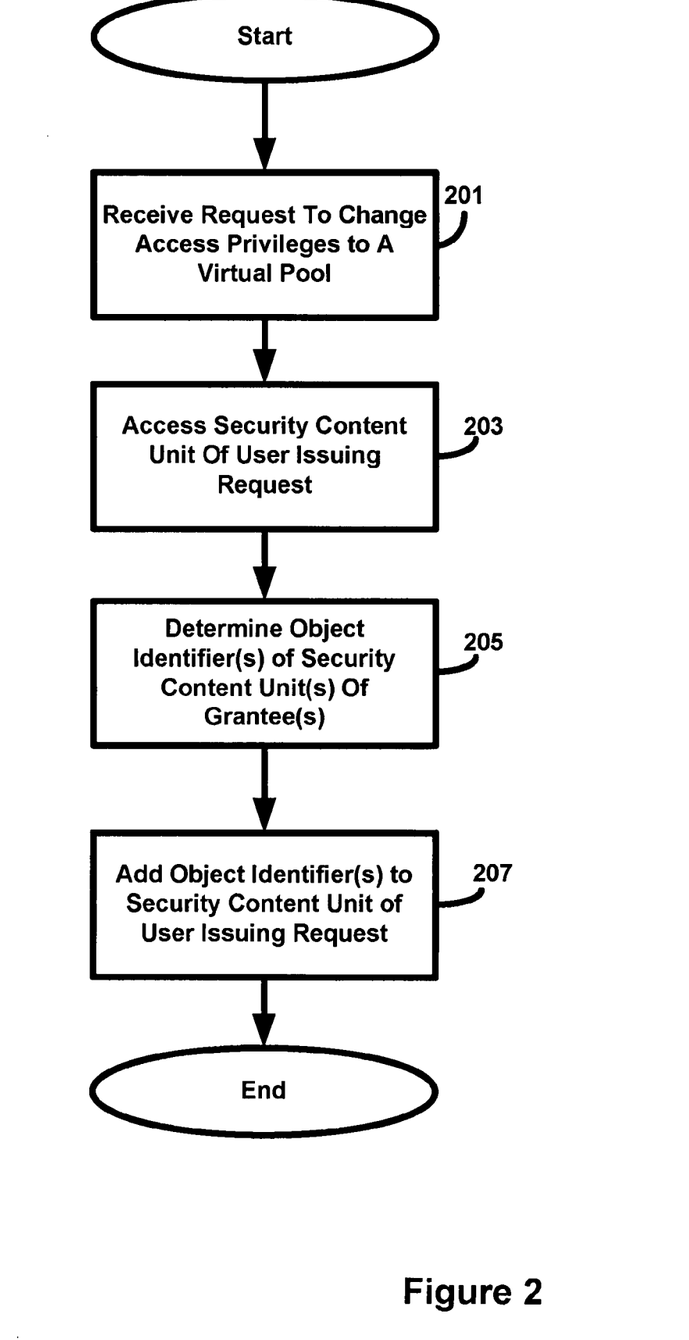
FIG. 2 is a flow chart of an illustrative process by which a user may grant access to a virtual pool to one or more other users, in accordance with one embodiment.

In some embodiments, a user may send a request to the OAS system to grant a particular user access to a virtual pool. FIG. 2 shows an illustrative process by which an OAS system may grant (or change) access privileges for a virtual pool. The process begins at act 201, where the OAS system receives a request to grant and/or modify access privileges. The request may specify the level of access permissions (e.g., read, write, delete, query, and/or any other suitable level of access privileges) and may identify the user(s) to whom access is being granted in any suitable way. For example, in some embodiments, the request may identify a user using the user's log in name. Thus, a user with the log in name "Joe" may grant access to a user with the log in name "Susan" read and write access to a virtual pool named "Sub-Pool #1" by sending a request to the OAS system to grant read and write access privileges to Susan for Sub-Pool #1. It should be appreciated that such a request may be a single communication between the user and the OAS system or may comprise multiple communications, each of which may provide different information.

The process continues to act 203, where the OAS system may access the security content unit of the user issuing the request (i.e., the grantor). The process next continues to act 205, where the OAS system determines the object identifier(s) of the security content unit of the grantee(s) of the access privileges. The process then continues to act 207, where the OAS system adds the grantee object identifier(s) to the security content unit of the user who issued the request and associates the grantee with the specified pool.

Thus, for example, if Joe sends a request to grant read and write access to Susan for Sub-Pool #1, the OAS system may add information to Joe's security content unit that indicates that Susan has read and write access to Sub-Pool #1. This may be accomplished in any suitable way, as the invention is not limited in this respect. For example, in some embodiments, the OAS system may identify Susan as having read and write access to Sub-Pool #1 by including Susan's log in name in a list of users that have access to that virtual pool.

In some embodiments, the OAS system may identify Susan as having access to Sub-Pool #1 by including the object identifier of Susan's security content unit in a list of users that have access to that virtual pool. Thus, when the OAS system receives the request to grant access privileges to Susan, it may determine the object identifier for Susan's security content unit (e.g., using mapping information that maps Susan's log in name to the object identifier for her security content unit), and may add the object identifier to the list.

Applicants have appreciated that in some embodiments in which authentication is performed using a security server, the OAS system may be unable to determine the object identifier for a user's security content unit without the user's authentication information. That is, because in some embodiments the information mapping a user's log in name to the object identifier for his or her content unit is stored on the security server and because the OAS system cannot access this information without the user's authentication information (e.g., password), the OAS system may not be able to determine the object identifier for a user's security content unit. Thus, if it is desired to add the object identifier for Susan's security content to a list in Joe's security content (e.g., to grant Susan access to one of Joe's sub-pools), the OAS system may not be able to determine this object identifier. In such situations, in some embodiments, the OAS system may add another identifier of Susan (i.e., Susan's log in name) to the list, rather than the object identifier for her security content unit, and when Susan authenticates to the OAS system, the OAS system may then determine the object identifier for her security content unit (e.g., in the manner discussed above) and update the list in Joe's security content unit by replacing Susan's log in name with her object identifier.

In some embodiments, a user may revoke or modify access privileges for a virtual pool. This may be done in any suitable way, as the invention is not limited in this respect. Thus, for example, after granting Susan read and write access to Sub-Pool #1, if Joe wishes to change the level of access that Susan has to read only privileges, Joe may send a request to the OAS system to modify Susan's level of access to read for Sub-Pool #1. The OAS system may receive the request and modify the information in Joe's security content unit to specify that Susan has only read privileges for Sub-Pool #1.

Alternatively, Joe may desire to entirely revoke Susan's access privileges to Sub-Pool #1 and may send a request to the OAS system to revoke Susan's access privileges to Sub-Pool #1. In response, the OAS system may remove Susan from the list of users that have access to Sub-Pool #1 (e.g., by removing Susan's name and/or object identifier from the list).

Figure 4:
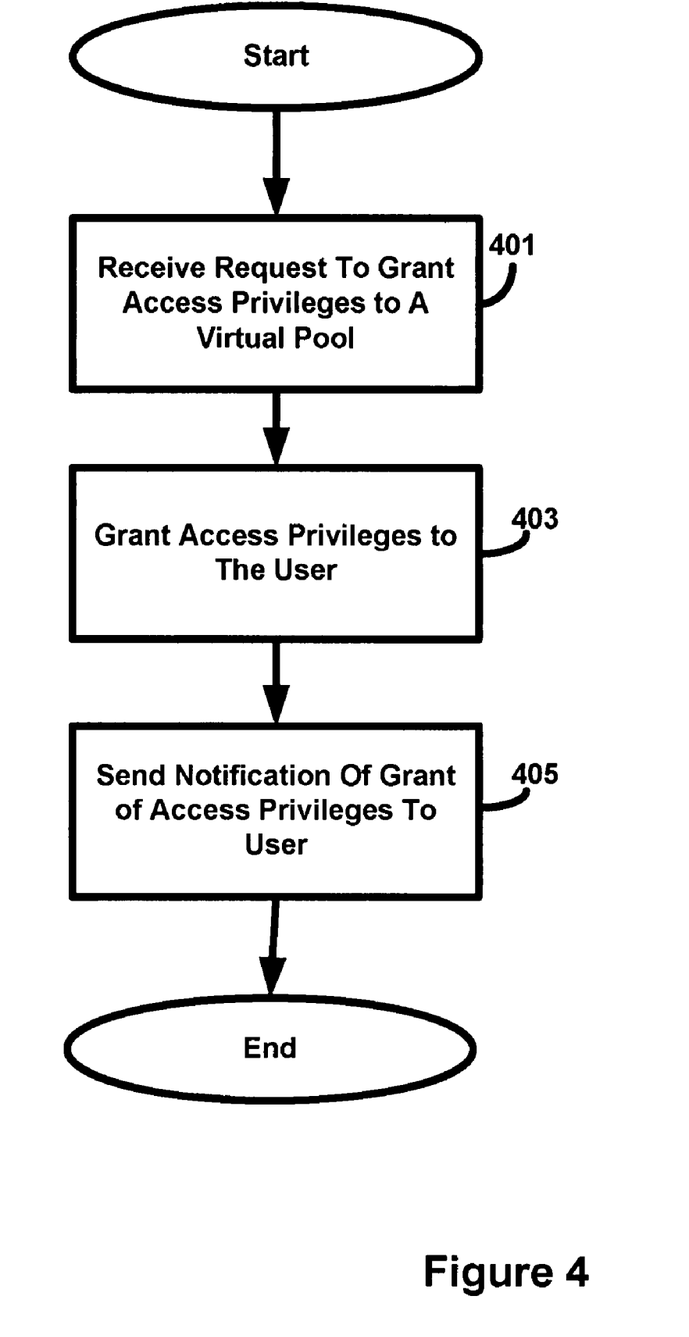
FIG. 4 is a flow chart of an illustrative process by which a notification of grant of access to a virtual pool may be sent to a user, in accordance with one embodiment.

In some embodiments, when a user grants access to a virtual pool to another user, the OAS system may send a notification to the user who is granted access to notify that user that he or she has been granted access to the virtual pool. The aspects directed to notification of grant of access privileges can be implemented in any suitable way, as the invention is not limited in this respect. FIG. 4 is an example of a process by which such a notification may be sent. The process begins at act 401, where the OAS system receives a request from a user to grant access privileges to another user (i.e., the grantee) for a virtual pool. The process next continues to act 403, where the OAS system grants the specified level of access to the grantee for the specified virtual pool. This may be done in any suitable way, as the invention is not limited in this respect. The process next continues to act 405, where the OAS system sends a notification to the grantee that access privileges have been granted. The notification may be sent in any suitable way, as the invention is not limited in this respect. For example, in some embodiments, the notification may be sent to a user via e-mail. In such embodiments, the OAS system may determine the e-mail address of the user in any suitable way, as the invention is not limited in this respect. For example in some embodiments, the log in name of a user may be the user's e-mail address. This makes it likely that the log in name is unique and also allows the OAS system to easily determine the e-mail address of a user. Thus, for example, if a first user grants access to a virtual pool to a second user by sending a request to the OAS system that includes the second user's log in name, the OAS system may determine the e-mail address for the second user from the second user's log in name.

The notification may include any suitable information, as the invention is not limited in this respect. For example, in some embodiments, the notification may include information identifying the content unit(s) to which the user receiving the notification is granted access. For example, the notification may include the object address(es) of the content units to which the user has been granted access or may identify those content units in any other suitable way. The user that receives the notification may then use the object identifier(s) in the notification to access the content units. Alternatively, the notification may identify the virtual pool(s) to which the user receiving the notification has been granted access. The user may use this information to request from the OAS system a list of content units stored in the virtual pool(s) to which the user has been granted access. Such a list may identify the content units in any suitable way, including with object identifiers and/or with metadata describing the content unit.

In some embodiments, in addition to specifying another individual user to whom the user grants access to one or more content units, the user may specify a group of users to whom the user grants access to one or more content units. This may be done in any suitable way, as the invention is not limited in this respect. For example, in some embodiments an administrator (e.g., a human administrator, a software program, or any other suitable administrator) may define a group of users, for example, by creating a group content unit that identifies the name of the group and the members of the group. The group content unit may identify the members of the group in any suitable way, such as, for example, by the log in names of the members, by the object identifiers of the security content units of the members, or in another way. In some embodiments in which a security server is used for authenticating users, information identifying the group name and the object identifier of the group content unit may be stored on the security server.

A user may grant the group access to a virtual pool by, for example, sending a request to the OAS system to grant the group access to a particular virtual pool. The OAS system may then access the user's security object and add the group to the list of users that are permitted to access the content unit. This may be done in any suitable way. For example, in some embodiments, the OAS system may specify in the security content unit that each individual user in the group has access by, for example, listing each member of the group's log in name and/or the object identifier for each member's security content unit. Alternatively, the OAS system may simply list the group name or the object identifier of the group content unit in the user's security content unit.

In some embodiments, after a content unit has been stored on the OAS system, and optionally placed in one or more virtual pools, the user who controls access to the content unit may subsequently place the content unit in a different virtual pool and/or remove the content unit from one, more, or all of the virtual pool(s) in which it was stored. This may be accomplished in any suitable way, as the invention is not limited in this respect. For example, in some embodiments, the user may issue a request to the OAS system that requests the OAS system to add the content unit to one or more virtual pools and/or remove the content unit from one or more virtual pools in which it is stored. In response, the OAS system may add the content unit to and/or remove the content unit from the specified virtual pool or pool(s). Thus, a user who "owns" a content unit may maintain dynamic control over access to the content unit. In some embodiments, the owner can exercise this control without having system administrator privileges (e.g., with just basic user privileges). In some embodiments described above, the owner of a content unit is the user who stored the content unit on the OAS system (e.g., in My World). However, the invention is not limited in this respect, as the owner of the content unit need not be the user who stored the content unit on the OAS system. Indeed, the owner of a content unit may be defined in any suitable way.

When a request is received, the OAS system may verify that the user issuing the request has the requisite privileges to perform the requested action. For example, when a user issues a request to store or move a content unit in a particular virtual pool, the OAS system may verify that the user has write access to the specified virtual pool. This may be done in any suitable way, as the invention is not limited in this respect. In some embodiments, the OAS system may verify that the user has write access to the virtual pool by determining the owner of the virtual pool (i.e., the user that created the pool or the user whose home pool the virtual pool is) and accessing the security content unit of the owner of the virtual pool. The OAS system may then determine from information stored in the security content unit which users, if any, have write access to the virtual pool. If the user that issued the request has write access to the pool, then the OAS system may perform the requested action. If the user does not have write access to the pool then the OAS system may deny the request.

When a user issues a read request to read a content unit, the OAS system may verify that the user has read access to the virtual pool in which the content unit is stored. This may be done in any suitable way, as the invention is not limited in this respect. For example, in some embodiments, the OAS system may verify that a user has read access to a virtual pool by determining in which virtual pool the content unit is stored. The OAS system may then determine which user stored the content unit on the OAS system, access that user's security content unit, determine which users have read access to the virtual pool in which the content unit is stored, and determine if the user that issued the access request is among these users. If the user that issued the request has read access to the pool, then the OAS system may return the requested content unit. If the user does not have read access to the pool then the OAS system may deny the request.

The above-described embodiments of the present invention can be implemented on any suitable computer, and a system employing any suitable type of storage system. Examples of suitable computers and/or storage systems are described in the patent applications listed below in Table 1 (collectively "the OAS applications"), each of which is incorporated herein by reference. It should be appreciated that the computers and storage systems described in these applications are only examples of computers and storage systems on which the embodiments of the present invention may be implemented, as the aspects of the invention described herein are not limited to being implemented in any particular way.

TABLE 1

| Title | Ser. No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access To Content In A Data Storage System | 10/731,613 | Dec. 9, 2003 |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |

TABLE 1-continued

| Title | Ser. No. | Filing Date |
|---|---|---|
| Methods And Apparatus For Modifying A Retention Period For Data In A Storage System | 10/762,044 | Jan. 21, 2004 |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |
| Methods And Apparatus For Tracking Content Storage In A Content Addressable Storage System | 10/911,247 | Aug. 4, 2004 |
| Methods and Apparatus For Storing Information Identifying A Source Of A Content Unit Stored On A Content Addressable System | 10/911,360 | Aug. 4, 2004 |
| Software System For Providing Storage System Functionality | 11/021,892 | Dec. 23, 2004 |
| Software System For Providing Content Addressable Storage System Functionality | 11/022,022 | Dec. 23, 2004 |
| Methods And Apparatus For Providing Data Retention Capability Via A Network Attached Storage Device | 11/022,077 | Dec. 23, 2004 |
| Methods And Apparatus For Managing Storage In A Computer System | 11/021,756 | Dec. 23, 2004 |
| Methods And Apparatus For Processing Access Requests In A Computer System | 11/021,012 | Dec. 23, 2004 |
| Methods And Apparatus For Accessing Information In A Hierarchical File System | 11/021,378 | Dec. 23, 2004 |
| Methods And Apparatus For Storing A Reflection On A Storage System | 11/034,613 | Jan. 12, 2005 |
| Method And Apparatus For Modifying A Retention Period | 11/034,737 | Jan. 12, 2005 |
| Methods And Apparatus For Managing Deletion of Data | 11/034,732 | Jan. 12, 2005 |
| Methods And Apparatus For Managing The Storage Of Content | 11/107,520 | Apr. 15, 2005 |
| Methods And Apparatus For Retrieval Of Content Units In A Time-Based Directory Structure | 11/107,063 | Apr. 15, 2005 |
| Methods And Apparatus For Managing The Replication Of Content | 11/107,194 | Apr. 15, 2005 |
| Methods And Apparatus For Managing the Storage Of Content In A File System | 11/165,104 | Jun. 23, 2005 |
| Methods And Apparatus For Accessing Content Stored In A File System | 11/165,103 | Jun. 23, 2005 |
| Methods And Apparatus For Storing Content In A File System | 11/165,102 | Jun. 23, 2005 |
| Methods And Apparatus For Managing the Storage of Content | 11/212,898 | Aug. 26, 2005 |
| Methods And Apparatus For Scheduling An Action on a Computer | 11/213,565 | Aug. 26, 2005 |
| Methods And Apparatus For Deleting Content From A Storage System | 11/213,233 | Aug. 26, 2005 |
| Method and Apparatus For Managing The Storage Of Content | 11/324,615 | Jan. 3, 2006 |
| Method and Apparatus For Providing An Interface To A Storage System | 11/324,639 | Jan. 3, 2006 |
| Methods And Apparatus For Managing A File System On A Content Addressable Storage System | 11/324,533 | Jan. 3, 2006 |
| Methods And Apparatus For Creating A File System | 11/324,637 | Jan. 3, 2006 |
| Methods And Apparatus For Mounting A File System | 11/324,726 | Jan. 3, 2006 |
| Methods And Apparatus For Allowing Access To Content | 11/324,642 | Jan. 3, 2006 |
| Methods And Apparatus For Implementing A File System That Stores Files On A Content Addressable Storage System | 11/324,727 | Jan. 3, 2006 |
| Methods And Apparatus For Reconfiguring A Storage System | 11/324,728 | Jan. 3, 2006 |
| Methods And Apparatus For Increasing The Storage Capacity Of A Storage System | 11/324,646 | Jan. 3, 2006 |
| Methods And Apparatus For Accessing Content On A Storage System | 11/324,644 | Jan. 3, 2006 |
| Methods And Apparatus For Transferring Content From A Storage System | 11/392,969 | Mar. 28, 2006 |
| Methods And Apparatus For Requesting Content From A Storage System | 11/391,654 | Mar. 28, 2006 |
| Methods And Apparatus For Transferring Content To Multiple Destinations | 11/392,981 | Mar. 28, 2006 |

TABLE 1-continued

| Title | Ser. No. | Filing Date |
|---|---|---|
| Methods And Apparatus For Receiving Content From A Storage System At Multiple Servers | 11/390,878 | Mar. 28, 2006 |
| Methods And Apparatus For Transferring Content From An Object Addressable Storage System | 11/390,564 | Mar. 28, 2006 |
| Methods And Apparatus For Requesting Content From An Object Addressable Storage System | 11/391,636 | Mar. 28, 2006 |
| Methods And Apparatus For Conversion Of Content | 11/438,770 | May 23, 2006 |
| Methods And Apparatus For Selecting A Data Format For A Content Unit | 11/439,025 | May 23, 2006 |
| Methods And Apparatus For Accessing A Content Unit On A Storage System | 11/439,022 | May 23, 2006 |
| Methods And Apparatus For Enabling Selection Of A Content Unit Data Format | 11/438,817 | May 23, 2006 |
| Methods And Apparatus For Accessing Content | 11/474,658 | Jun. 26, 2006 |
| Methods And Apparatus For Providing Access To Content | 11/474,846 | Jun. 26, 2006 |
| Methods And Apparatus For Retrieving Stored Content | 11/474,655 | Jun. 26, 2006 |
| Methods And Apparatus For Accessing Content Through Multiple Nodes | 11/474,661 | Jun. 26, 2006 |
| Methods And Apparatus For Receiving Content | 11/474,719 | Jun. 26, 2006 |
| Methods And Apparatus For Processing Access Requests | 11/474,749 | Jun. 26, 2006 |
| Methods And Apparatus For Providing Content | 11/474,802 | Jun. 26, 2006 |
| Methods And Apparatus For Managing Content | 11/483,465 | Jul. 10, 2006 |
| Methods And Apparatus For Moving Content | 11/483,799 | Jul. 10, 2006 |
| Methods And Apparatus For Storing Content | 11/483,494 | Jul. 10, 2006 |
| Methods And Apparatus For Caching Content In A Computer System Employing Object Addressable Storage | 11/519,374 | Sep. 12, 2006 |
| Methods And Apparatus For Selection Of A Storage Location For A Content Unit | 11/644,430 | Dec. 22, 2006 |
| Methods And Apparatus For Modifying An Object Identifier For A Content Unit | 11/644,423 | Dec. 22, 2006 |
| Methods And Apparatus For Storing Content On A Storage System | 11/644,174 | Dec. 22, 2006 |
| Methods And Apparatus For Increasing The Storage Capacity Of A Zone Of A Storage System | 11/644,857 | Dec. 22, 2006 |
| Methods And Apparatus For Selecting A Storage Zone For A Content Unit | 11/644,428 | Dec. 22, 2006 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A host computer for accessing a plurality of user content units stored on at least one object addressable storage (OAS) system, wherein each of the plurality of user content units is accessible from the OAS system using an object identifier, wherein the object identifier for each of the plurality of user content units, from the perspective of an issuer of an access request to retrieve the at least one of the plurality of content units, does not control where the at least one of the plurality of content units is logically or physically stored on the OAS system, the at least one OAS system being logically divided into a plurality of storage pools, a first user of the at least one storage system being granted access privileges to one of the plurality of storage pools, the host computer comprising:

an output; and
at least one controller, coupled to the output, that:
requests, via the output, the OAS system to create a sub-pool of the pool to which the first user is granted access privileges; and identifies to the OAS system at least one second user of the at least one storage system to whom the first user grants privileges to access content units stored in the sub-pool.

2. The host computer of claim 1, wherein the at least one controller:
identifies to the OAS system a level of access that the first user grants the at least one second user for content units stored in the sub-pool.

3. The host computer of claim 2, wherein the at least one controller:
sends a request to the OAS system to modify the level of access that the first user grants the at least one second user for content unit stored in the sub-pool.

4. The host computer of claim 1, wherein the at least one controller:
sends a request to the OAS system to revoke the second user's privileges to access content units stored in the sub-pool.

5. The host computer of claim 1, wherein the sub-pool is a first sub-pool and wherein the at least one controller:
sends a first request to the OAS system to create a second sub-pool of the pool to which the first user is granted access privileges;
sends a second request to the OAS system to store a content unit on the OAS system; and
indicates to the OAS system at least one of the first and second sub-pools in which to store the content unit.

6. The host computer of claim 5, wherein the at least one controller:
indicates to the OAS system at least one of the first and second sub-pools in which the content unit is stored from which to remove the content unit.

7. A method of controlling access to a plurality of user content units stored on at least one object addressable storage (OAS) system, wherein each of the plurality of user content units is accessible from the OAS system using an object identifier, wherein the object identifier for each of the plurality of content units, from the perspective of an issuer of an access request to retrieve the at least one of the plurality of content units, does not control where the at least one of the plurality of content units is logically or physically stored on the OAS system, the at least one OAS system being logically divided into a plurality of storage pools, a first user of the at least one storage system being granted access privileges to one of the plurality of storage pools, the method comprising acts, performed by the first user of the storage system, of:
requesting the OAS system to create a sub-pool of the pool to which the first user is granted access privileges; and
identifying to the OAS system at least one second user of the at least one storage system to whom the first user grants privileges to access content units stored in the sub-pool.

8. The method of claim 7, further comprising an act of:
identifying to the OAS system a level of access that the first user grants the at least one second user for content units stored in the sub-pool.

9. The method of claim 8, further comprising an act of:
sending a request to the OAS system to modify the level of access that the first user grants the at least one second user for content unit stored in the sub-pool.

10. The method of claim 7, further comprising an act of:
sending a request to the OAS system to revoke the second user's privileges to access content units stored in the sub-pool.

11. The method of claim 7, wherein the sub-pool is a first sub-pool and wherein the method further comprises acts of:
sending a first request to the OAS system to create a second sub-pool of the pool to which the first user is granted access privileges;
sending a second request to the OAS system to store a content unit on the OAS system; and
indicating to the OAS system at least one of the first and second sub-pools in which to store the content unit.

12. The method of claim 11, further comprising an act of:
indicating to the OAS system at least one of the first and second sub-pools in which the content unit is stored from which to remove the content unit.

13. At least one tangible computer readable medium encoded with instructions that, when executed, perform a method of controlling access to a plurality of user content units stored on at least one object addressable storage (OAS) system, wherein each of the plurality of user content units is accessible from the OAS system using an object identifier, wherein the object identifier for each of the plurality of user content units, from the perspective of an issuer of an access request to retrieve the at least one of the plurality of content units, does not control where the at least one of the plurality of content units is logically or physically stored on the OAS system, the at least one OAS system being logically divided into a plurality of storage pools, a first user of the at least one storage system being granted access privileges to one of the plurality of storage pools, the method comprising acts, performed by the first user of the storage system, of:
requesting the OAS system to create a sub-pool of the pool to which the first user is granted access privileges; and
identifying to the OAS system at least one second user of the at least one storage system to whom the first user grants privileges to access content units stored in the sub-pool.

14. The at least one tangible computer readable medium of claim 13, wherein the method further comprises an act of:
identifying to the OAS system a level of access that the first user grants the at least one second user for content units stored in the sub-pool.

15. The at least one tangible computer readable medium of claim 14, wherein the method further comprises an act of:
sending a request to the OAS system to modify the level of access that the first user grants the at least one second user for content unit stored in the sub-pool.

16. The at least one tangible computer readable medium of claim 13, wherein the method further comprises an act of:
sending a request to the OAS system to revoke the second user's privileges to access content units stored in the sub-pool.

17. The at least one tangible computer readable medium of claim 13, wherein the sub-pool is a first sub-pool and wherein the method further comprises acts of:
sending a first request to the OAS system to create a second sub-pool of the pool to which the first user is granted access privileges;
sending a second request to the OAS system to store a content unit on the OAS system; and
indicating to the OAS system at least one of the first and second sub-pools in which to store the content unit.

18. The at least one tangible computer readable medium of claim 17, wherein the method further comprises an act of:
indicating to the OAS system at least one of the first and second sub-pools in which the content unit is stored from which to remove the content unit.

* * * * *